Feb. 20, 1951  G. PHELPS  2,542,568
COIN-CONTROLLED PROGRAM DISTRIBUTION SYSTEM
Filed Dec. 5, 1945  5 Sheets-Sheet 2

FIG. 2

INVENTOR.
GEORGE PHELPS
BY
Mueller, Dodds & Mason
Attorneys

Feb. 20, 1951  G. PHELPS  2,542,568
COIN-CONTROLLED PROGRAM DISTRIBUTION SYSTEM
Filed Dec. 5, 1945  5 Sheets-Sheet 3

INVENTOR.
GEORGE PHELPS
BY
Mueller, Dodds & Mason
Attorneys

Feb. 20, 1951 G. PHELPS 2,542,568
COIN-CONTROLLED PROGRAM DISTRIBUTION SYSTEM
Filed Dec. 5, 1945 5 Sheets-Sheet 4

*INVENTOR.*
GEORGE PHELPS
BY
Muelly, Dodds & Mason
Attorneys

Patented Feb. 20, 1951

2,542,568

UNITED STATES PATENT OFFICE 2,542,568

COIN-CONTROLLED PROGRAM DISTRIBUTION SYSTEM

George Phelps, Chicago, Ill., assignor to Communication Equipment and Engineering Company, Chicago, Ill., a corporation of Illinois Application December 5, 1945, Serial No. 632,985

20 Claims. (Cl. 179—6.3)

This invention relates to coin-controlled electrical signaling systems and particularly to such systems for distributing programs from a central or sending station to a number of remote coin-controlled program-reproducing devices.

At present there are in commercial use a large number of coin-controlled program-reproducing or record-playing devices popularly known as "juke boxes." It has been realized that it would be desirable to be able to exercise some control over such devices from a central station; for example to cause the devices to make announcements or reproduce advertising material or to control the nature and duration of the program being reproduced by the devices. It would also be desirable to transmit the program itself from a central station, thereby avoiding the investment in a large number of program records which have an extremely ephemeral popularity.

It is an object of the invention, therefore, to provide a new and improved coin-controlled electrical signaling system by means of which announcements or advertising material, or both, may be transmitted from a central sending station to remote program-reproducing devices for reproduction, preferably controlled conjointly with or independently of the deposit of coins in such devices.

It is another object of the invention to provide a new and improved coin-controlled electrical signaling system by means of which the nature and the duration of the program reproduced by the several coin-controlled devices may be readily controlled from a central sending station.

For a better understanding of the invention, together with other and further objects thereof, reference is had to the following description taken in connection with the accompanying drawings while its scope will be pointed out in the appended claims.

In accordance with the invention, a coin-controlled electrical signaling system for program distribution comprises a sending station including a program-representative signal-supply circuit and means for controlling the sending of signals therefrom. The system also includes a receiving station including a program-representative signal-output circuit and a coin-controlled means for controlling the energization of the output circuit. The system further includes a signal-transmission link between the sending and receiving stations, means at the sending station controlled by the first-named means for transmitting a control signal and means at the receiving station responsive to the control signal for modifying the action of the coin-controlled means. In a preferred form of the invention, the sending station includes also an announcing circuit, means for selectively controlling the sending of signals from either the program-representative circuit or the announcing circuit and means controlled by such means for transmitting a control signal only upon energization of the announcing circuit.

Further in accordance with the invention, a coin-controlled electrical signaling system of the type described comprises a plurality of signal-supply circuits and means for controlling the circuits to send signals therefrom in sequence, together with means at the sending station for transmitting a control signal only upon transmission of a signal from a predetermined one of the supply circuits.

In accordance with a further feature of the invention, there is provided in a coin-controlled electrical signaling system of the type described, a coin-controlled mechanism comprising a coin chute, a coin-operated element movable in the chute, a pair of coin-arresting members protruding into the chute spaced along the path of movement of a coin therethrough, and signal-responsive means connected to actuate the members sequentially to arrest a coin in its travel through the chute. The term "coin" is used herein and in the appended claims to denote either an actual coin or a slug, check, or equivalent.

Referring now to the drawings, Figs. 6, 7 and 8 are fragmentary detail views of certain coin-operated elements included in the mechanism of Figs. 3, 4 and 5 in several phases of operations; while

Returning now to Figs. 1 and 2 of the drawing, there is there represented a coin-controlled electrical signaling system for program distribution embodying the invention. This system comprises a sending or transmitting station represented in Fig. 1 and including a plurality of signal-supply circuits, for example, a program-representative signal-supply circuit 10 and an announcing circuit 11. The circuit 10 may be supplied from a record-playing phonograph which may be of either the automatic or manual record-changing type. For the sake of simplicity, there is shown schematically an electric phonograph comprising a pick-up arm 12 cooperating with a turn-table 13 driven by a motor 14, the tone arm 12 being connected to the input circuit of a music preamplifier unit 15, the output terminals of which are connected to the signal-supply circuit 10. The announcing circuit 11 may be energized from a microphone 16 through a voice preamplifier 17.

Figure 1:
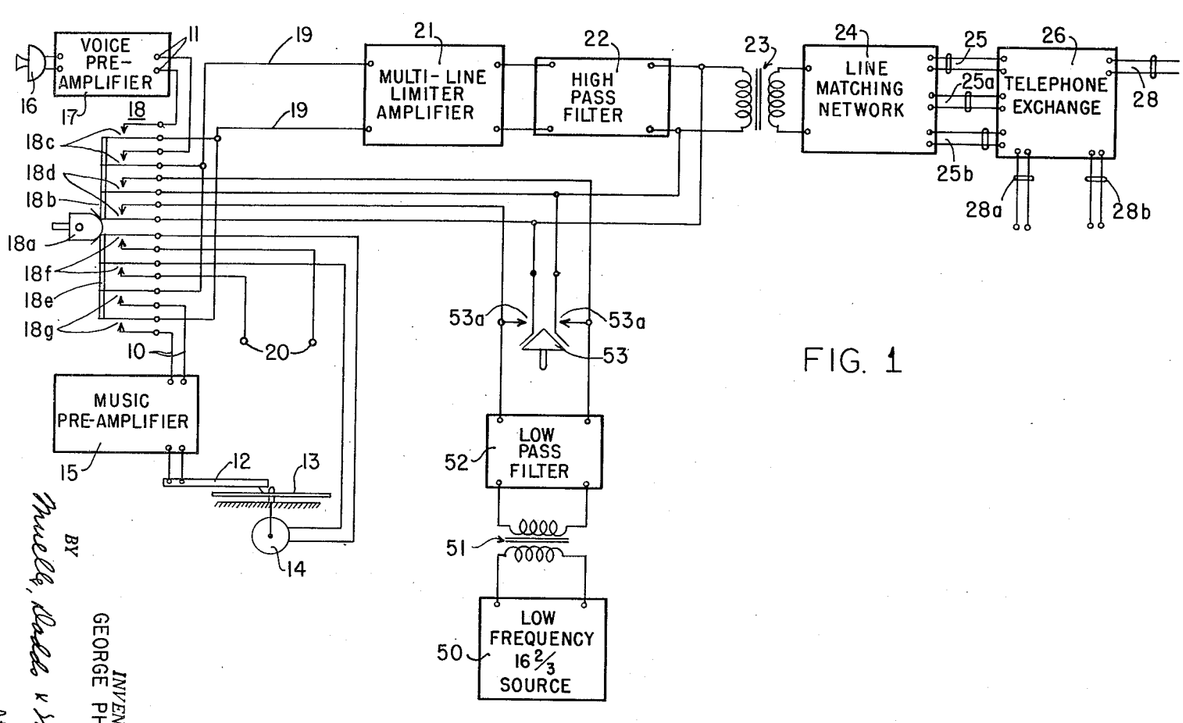
Fig. 1 is a circuit diagram, partially schematic, of a sending station

The sending station also includes means for selectively controlling the sending of signals from either of the signal-supply circuits 10 or 11. This means may be in the form of a conventional key-operated telephone switch 18 including a pivoted operating member 18a, an upper movable assembly 18b effective to close normally open pairs of contacts 18c and 18d and a lower movable assembly 18e connected to close the normally open pairs of contacts 18f and 18g. The contacts 18c are effective, when closed, to connect the announcement signal-supply circuit 11 to an input circuit 19, 19 of the signal-translating channel of the sending station. The contacts 18f are effective, when closed, to connect the motor 14 of the record-playing phonograph to supply-circuit terminals 20 which may be a conventional 110 volt, 60 cycle commercial power line. The contacts 18g are effective, when closed, to connect the signal-supply circuit 10 to the circuit 19.

The signal-translating channel of the sending station energized from the circuit 19 may be of any suitable conventional design but there is illustrated, by way of example, connected in cascade to the circuit 19 a multi-line limiter-amplifier unit 21, a high-pass filter 22, a broad-band coupling transformer 23, a line-matching network 24, and a group of signal-translating circuits, which may be conventional telephone lines 25, 25a and 25b, extending from the network 24 to a central telephone exchange 26. There are also provided a group of outgoing telephone lines 28, 28a and 28b which may lead from the telephone exchange 26 to a plurality of receiving stations of the system represented in Fig. 2, to which reference is now made, it being understood that, in accordance with conventional practice, the several ingoing lines 25, 25a and 25b and their corresponding outgoing lines 28, 28a and 28b are continuous through the exchange 26 and to the several receiving stations. The unit 24 serves to match the impedance of the transformer 23 to the different impedances of the lines 28, 28a and 28b to receiving stations at different locations and distances.

Figure 2:
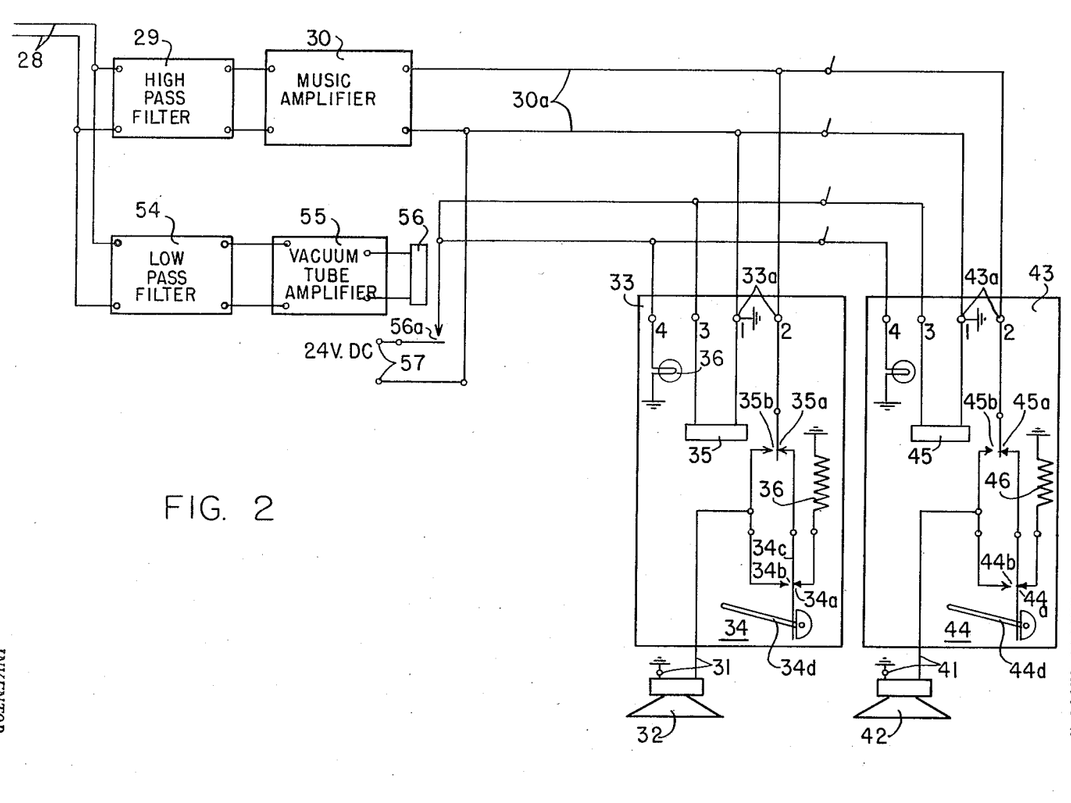
Fig. 2 is a circuit diagram, partially schematic, of a receiving station which together comprise an electrical signaling system of the invention.

The receiving station of Fig. 2 includes a signal-translating channel connected to the incoming circuit 28 and including, in the order named, a high-pass filter 29, a music amplifier 30 having an output circuit 30a and one or more program-representative signal-output circuits, such as output circuits 31 and 41 connected to signal reproducers or loud speakers 32 and 42, respectively. Connected between the circuit 30a and the signal-output circuits 31 and 41 are step-by-step coin-controlled units 33 and 43, respectively, having input terminals 33a and 43a, respectively, connected in parallel to the output circuit 30a of the signal-translating channel. It is to be understood that the units 33 and 43 may be identical so that a description of one will suffice, corresponding elements of the two units being represented by reference numerals separated by one decade. Thus the unit 33 includes a coin-operated pivoted switch 34 provided with a pair of normally closed contacts 34a and a pair of normally open contacts 34b. The movable element 34c of the switch 34 is connected to one side of the signal-translating channel 30a through normally closed contacts 35a of a two-position switch or relay 35 provided also with normally open contacts 35b. The fixed ones of the normally open contacts 34b and 35b are connected in common to one side of the signal-output circuit 31, the other side of which is constituted of a ground connection, as illustrated. The fixed one of the contacts 34a is connected to ground through a load resistor 36 which approximately matches the impedance of the loudspeaker 32.

It will be understood that the telephone lines 25a, 25b, 25c, the telephone exchange 26 and the telephone line 28 together constitute a signal-transmission link between the sending and receiving stations. It will be understood, however, that this signal-transmission link may be of any conventional type of wire or space radiation link.

The electrical signaling system of the invention also includes means at the sending station, controlled by the means for selectively sending signals from either of the signal-supply circuits 10 or 11, for transmitting a control signal only upon each energization of the link between the sending and receiving stations from the announcing circuit 11 and this control signal preferably has identifying characteristics upon the energization and deenergization of the link from the announcing circuit. For example, this control signal may be a single continuous signal or a group or series of discontinuous signals but in the system specifically described, the control signal is a continuous low-frequency signal, such 16⅔ cycle signal, supplied from a source 50 through an impedance-matching transformer 51, a low-pass filter 52 and the switch contacts 18d of the key 18 to the input circuit of the line-matching network 24 through the coupling transformer 23. With this arrangement, the continuous low-frequency control signal is impressed upon the link including the signal-translating channel of the sending station only during the energization of the announcing circuit 11 by operation of the key 18a to its uppermost position and the identifying characteristics occurring upon the energization and deenergization of the link from the announcing circuit 11 are the initiation and termination of the continuous low-frequency control signal. If desired, there may also be provided at the sending station means for transmitting a control signal independently of the main control key 18 whereby a program signal may be applied to the signal-output circuit 31 independently of the deposit of a coin in the coin controlled unit 33. This means may comprise a manually operable key 53 having a pair of normally open contacts 53a, 53a for connecting the low-frequency control signal source 50 to the signal-translating channel of the sending station independently of operation of the main control key 18.

The electrical signaling system of the invention further includes at the receiving station relay means responsive to the low-frequency control signal for mechanically modifying the action of the coin-controlled units 33, 43 and having electrical contacts for independently energizing the signal-output circuits 31, 41 thereof. This relay means comprises a low-pass filter 54 designed to pass the low-frequency control signal and having input terminals connected to the signal input circuit 28 and output terminals connected through a vacuum tube amplifier 55 to a relay 56 having normally open contacts 56a. The contacts 56a are connected to control the energization of the two-position switches 35, 45 from supply-circuit terminals 57, which may be energized with 24 volts direct current. With the connections as shown, it is seen that, with the switch 35 in an energized position, its contacts 35b are effective to energize the output circuit 31 directly, while in the deenergized position they are effective to energize the output circuit 31 through contacts 34b of the coin-operated switch 34. If desired, the coin-controlled unit 33 may include a signal or pilot light 36' connected to be energized from supply-circuit terminals 57 through the contacts 56a of relay 56.

The operation of the relay means comprising the relay 56 and the switches 35 and 45 in modifying the action of the coin-controlled switches 34 and 44, respectively, will be deferred until after a detailed description of the coin-controlled mechanism, per se. In considering the operation of the system as a whole it may be merely stated at this point that the switch 35 cooperates with the coin-controlled switch 34 to advance a deposited coin in steps through the mechanism, preferably allowing it to be collected in a collection hopper only after two successive operations of the switch 35. It will further be assumed that all of the coin-controlled units 33, 43, etc. are connected in parallel and that there is a single signal-translating link between the sending station of Fig. 1 and each of the coin-controlled units. It is an object of the system to permit an announcer at the sending station alternately to send news, advertising material or announcements between successive periods of music transmission. The service is charged for on a coin basis and the operation of the system is such that each customer is assured of at least one complete record program. In order to ensure this feature, the collection of coins at the coin-control device is under the control of the operator at the central station and the arrangement is such that a coin deposited in the coin-controlled device at the receiving station is not collected until after two successive announcement periods.

Turning now to the specific operation of the system represented in Figs. 1 and 2, it will be assumed that the operating element 18a of the key 18 is initially operated to its upward position. Further, the operation of only the coin-controlled device will be considered specifically since the devices 33 and 43 are identical. Under these conditions any announcement made into the microphone 16 is amplified in the unit 17 and translated over the channel comprising the elements 19, 21 and 22, 23 and 24 and one of the telephone lines 25a, 25b, 25 to the telephone exchange 26. There the program signal is applied to the outgoing telephone circuit 28 connecting with the receiving station and is translated by the units 29 and 30 and the circuit 30a to the input terminals 33a of the coin-controlled device 33. Under the conditions assumed, with no coin deposited in the device 33 and the contacts 34a closed and the contacts 34b open and neglecting for the moment the effect of the control signal sent from the sending station, the contacts 35a of switch 35 are closed and the contacts 35b open so that the signal-output circuit 31 is open at the contacts 34b and 35b. However, upon the operation of the key 18, as described, a continuous low-frequency signal from the source 50 is simultaneously applied through contacts 18d to the coupling transformer 23 and this signal is translated over the signal-transmission link described above to the low-pass filter 54 at the receiving station and thence to the vacuum-tube amplifier 55 and relay 56, which is designed to respond to this continuous low-frequency signal. Relay 56 closes its contacts 56a, thus impressing potential from the supply terminals 57 upon the two-position switch 35 which closes its contacts 35b to energize the signal-output circuit 31 directly and to supply the announcement signal to the loud-speaker 32 for reproduction. Simultaneously, the energization circuit for the signal indicating lamp 36' is completed through the contacts 56a of relay 56 to indicate that an announcement is being transmitted. It is to be noted that, with this arrangement, an announcement is transmitted to the signal-output circuit 31 independently of the deposit of a coin in the coin-controlled mechanism 33 to close the coin-operated switch 34.

When the operator at the sending station has completed his announcements he operates the element 18a of the key 18 to its lower position. This operation has the effect of opening the contacts 18c, thereby disconnecting the announcement signal circuit 11 from the signal-translating channel described above. Simultaneously, the contacts 18d disconnect the low-frequency signal from the source 50 from the coupling transformer 23 of the signal-translating channel so that the relay 56 and the switch 35 at the receiving station drop out, thereby opening the contacts 35b and closing the contacts 35a to put the energization of the signal-output circuit 31 under the control of the coin-operated switch 34.

Simultaneously with the opening of the contacts 18c and 18d, the contacts 18f are closed to energize the motor 14 of the record-playing phonograph from supply terminals 20 through contacts 18f. The rotation of the turn-table 13 by the motor 14 causes the pick-up arm 12 to develop and apply a program signal to the unit 15 for amplification and the amplified signal is applied through the contacts 18g to the input circuit 19 of the signal-translating channel described above. This signal is translated by the signal-transmission link and impressed upon the input terminals 33a of the unit 33. If no coin is deposited in the unit, the signal is not reproduced by the loud speaker 32. However, if a coin has been deposited in the unit, the coin is effective to actuate the switch 34 to close its contacts 34b, thereby applying the signal from the input terminals 33a through the contacts 35a and the contacts 34b to the signal-output circuit 31 for reproduction by the loud speaker 32, as described in more detail hereinafter.

The transmission of the low-frequency control signal from the source 50 concurrently with the transmission of the announcement signal is effective to advance the coin in the unit 33 one step in its travel through the unit. Upon the transmission of a second control signal after a coin has been deposited, the coin is released from the unit 33 and collected in a suitable hopper. By this arrangement, the listener is ensured of at least one complete record program from the phonograph 12, 13, 14 and, if his coin is deposited at any intermediate point in any particular record, he will hear the remaining portion of that record and the following complete record.

In case for any reason the operator should wish to send a musical program to the receiving station independently of the deposit of a coin in unit 33, he may do this by closing the key 53, which is effective to impress the control signal from the source 50 through the contacts 53a, 53a on the signal-transmitting channel for operation of the relay 56 and the switch 35 independently of operation of the key 18 to the announcing position in which a control signal is automatically transmitted. By this method, the operator is enabled to provide the listener with a free program, if this is desired for any reason.

Figure 3:
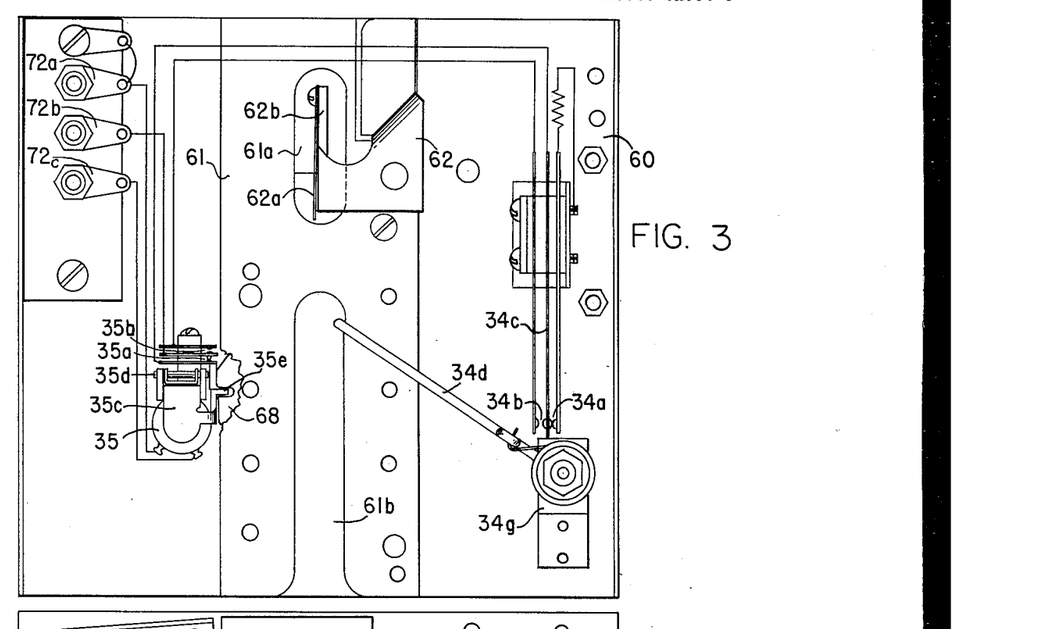
Fig. 3 is a front elevation, Fig. 4 a back elevation and Fig. 5 a top plan view of a coin-controlled mechanism suitable for use in the system of Figs. 1 and 2 and comprising one feature of the invention.
Figure 4:
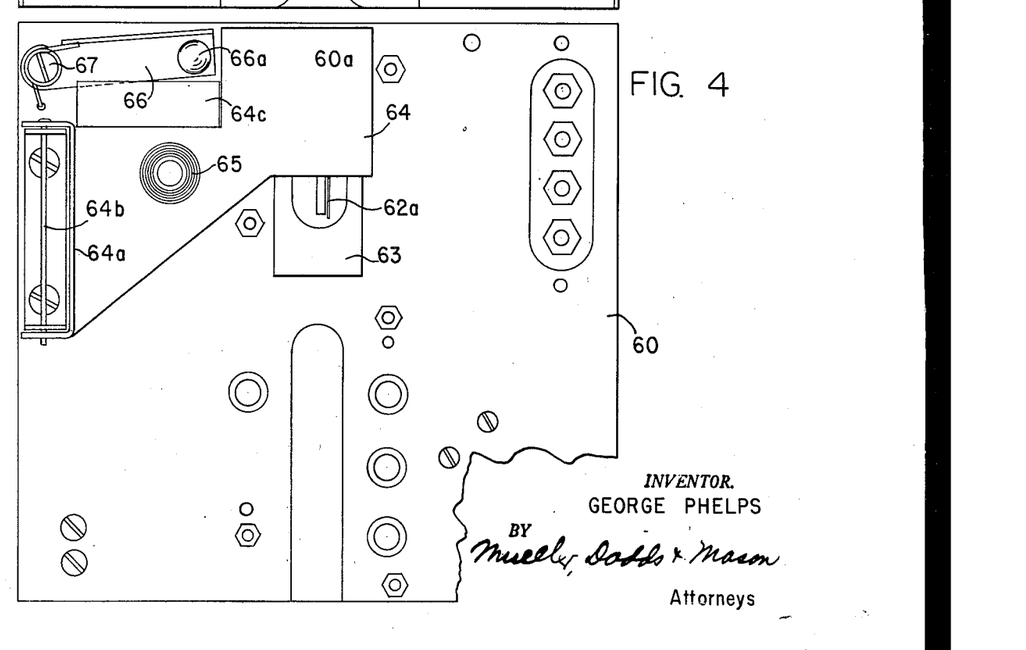
Figure 5:
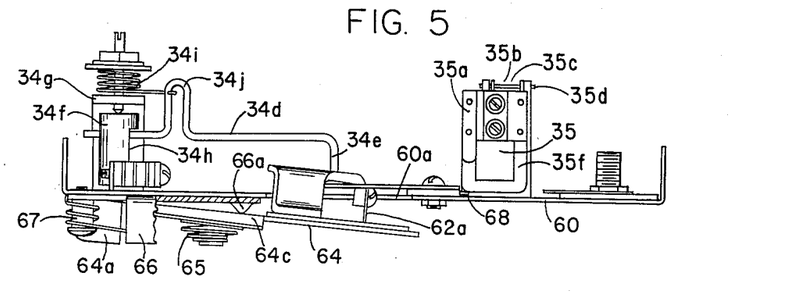

Turning now to Figs. 3, 4 and 5 of the drawings, there is illustrated one specific embodiment of coin-controlled mechanism suitable for use as the units 33 and 43 of Fig. 2. This mechanism comprises a plate-like frame member 60 to which is secured a coin chute 61. At the upper entrance of the coin chute is a spurious coin ejector which may be of any conventional type, although there is illustrated by way of example a small-coin ejector 62 having a light hair-spring 62a having a reversely bent portion projecting into the coin chute. Opposite the ejector spring 62a is an aperture 63 in the frame plate 60 connecting with the coin chute 61, the width of this aperture 63 being such that any coin of a size smaller than that for which the coin chute is designed is ejected through the aperture 63 by the spring 62a in its travel down the chute. The spring 62a is mounted on a flange 62b normal to the plane of the frame plate 60 and registering with an aperture 61a in the coin chute which is too small to permit coins to pass therethrough. The coin ejector 62 is supported from a bracket 64 on the rear of the frame plate 60 and this bracket is pivotally supported at one edge of the frame plate 60 by means of the hinge 64a and hinge pin 64b. The bracket is biased by means of a compression coil spring 65 into the position in which it covers a recess 60a in the upper edge of the frame plate 60 joining the recess 63 but of a width sufficient to pass normal coins. Cooperating with the ejector bracket 64 is an operating bracket 66, which may be of conventional angle section, supported by a pivot pin 67 immediately above the hinge 64a. The bracket 66 is provided with an upset camming surface or protrusion 66a which is disposed to cooperate with a camming section 64c of bracket 64 so that, when the bracket 66 is depressed, the protrusion 66a engages the portion 64c and cams the bracket 64 from its normal position against the action of biasing spring 65 as shown most clearly in Fig. 5. In this position, the flange 62b protrudes through the apertures 61a and 60a and positively ejects any coins which may have become lodged in the upper portion of the coin chute.

The coin-operated switch 34 of Fig. 2 comprises a coin-operated element or arm 34d having a bent over arm 34e projecting into the coin chute and adapted to be engaged by a deposited coin. The element or arm 34d is secured in a block 34f of insulation material which, in turn, is pivotally supported in a bracket 34g secured to the frame plate 60. The block 34f has a flat 34h on one side thereof which, in the position of the elements illustrated in Fig. 3, engages the switch arm 34c in such a position that the contacts 34a are closed and the contacts 34b are open. A torsional biasing spring 34i surrounds an extension of the pivotal support of the block 34f and engages an offset portion 34j of the arm 34d to bias the switch into the position illustrated in Fig. 3 in which the portion 34e of the coin-operated element is at the upper end of an aperture 61b of the coin chute 61.

Within the coin chute 61 there are arranged a pair of coin-arresting members protruding into the chute and spaced along the path of movement of a coin therethrough. Specifically these members may be in the form of a pair of pivotally supported members or dogs 68 and 69 having upper coin-arresting shoulders 68a and 69a and lower coin-arresting shoulders 68b and 69b, respectively. The pivotally supported dogs 68 and 69 are interconnected through a pivotally supported member or dog 70 in the nature of an idler or rotation reversing gear to ensure simultaneous movement of the members 68 and 69 about their respective pivots in the same sense. There is also arranged in the coin chute a third coin-arresting member 71 protruding into the chute and preceding the members 68 and 69 and normally ineffective to arrest the travel of a coin through the chute but actuated by the first deposited coin to arrest subsequently deposited coins. The member 71 has an upper coin-arresting shoulder 71a and a lower coin contacting surface 71b and is effective in the manner described as will appear from the following description of the travel of a coin through the coin chute.

The coin-controlled mechanism 33 also includes signal-responsive means connected to actuate the members 68 and 69 sequentially to arrest a coin in its travel through the chute. The signal-responsive means comprises the two-position relay or switch 35 described above. This relay comprises a bracket-like magnetic armature 35c pivoted at 35d and having an extending arm 35e engaging a notch 68c in the edge of the coin-arresting member 68. The relay 35 also includes the two-position switch 35a, 35b, described schematically above. Secured to the frame plate 60 but insulated therefrom are a series of circuit terminals 72a, 72b, 72c, connected with the switch contacts 34a, 34b and 35a and 35b, as indicated in Figs. 2 and 3.

The signal-responsive relay or switch 35 includes means for biasing the coin-arresting members 68 and 69 to support a deposited coin initially on the lower shoulder of the first of the members to be contacted, that is, the shoulder 68b of the member 68. This means may be in the form of a leaf-biasing spring 35f acting against the arm 35e of the armature 35c to bias it into its lower-most position, that is for biasing the members 68 and 69 into their limiting counterclockwise positions. Signal-responsive relay 35 further includes means connected pivotally to actuate the coin-arresting members 68 and 69 in the same sense against the action of the biasing spring 35f, this means being the magnetic armature 35c which, when attracted by the winding of the relay, is effective to raise the arm 35e and thus to move the coin-arresting members 68 and 69 in a clockwise direction about their pivotal supports.

Figure 6:
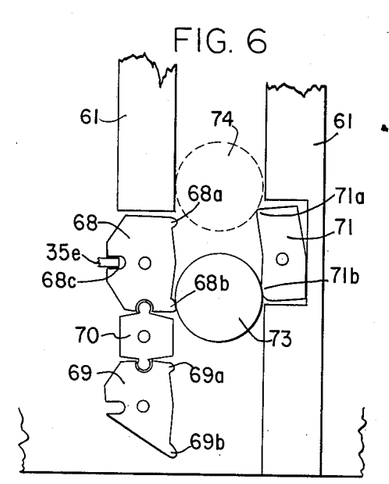
Figure 7:
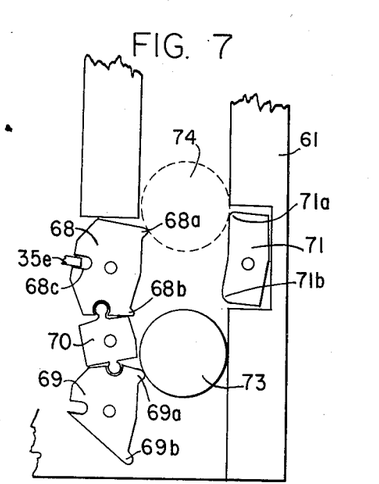
Figure 8:
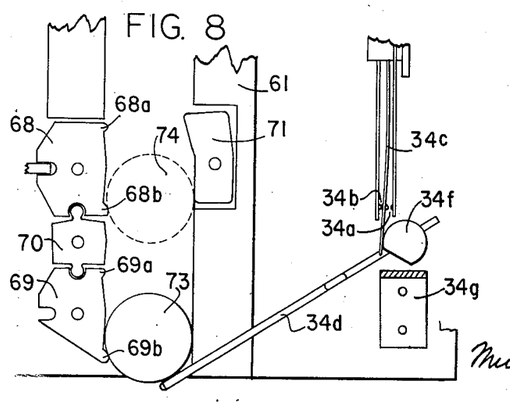

The operation of the coin-controlled mechanism may be best understood by reference to Figs. 6, 7 and 8 of the drawings which show the successive steps in the travel of a coin through the coin chute. In Fig. 6, a first coin 73 when dropped into the chute passes the upper shoulder 71a of the coin-arresting member 71 and comes to rest against the lower shoulder 68b of the coin-arresting member 68. At the same time, the member 71, which is free to rotate about its pivot, is rotated in a counter-clockwise direction by the weight of the coin 73, thus causing the shoulder 71a to protrude into the coin chute and arrest a second coin 74 which may be deposited before the coin 73 has travelled through the chute and been collected. The several positions of the elements shown in Fig. 6 correspond to that when a coin is deposited during the playing of a program when no control signal is being transmitted, so that the signal-responsive relay 35 is deenergized.

When a control signal is transmitted, as described above, the signal-responsive relay 35 is actuated and its arm 35e engaging the notch 68c of the member 68 rotates the elements 68 and 69 both in a clockwise direction about their respective pivots to the positions shown in Fig. 7. This movement of the coin-arresting member 68 allows the coin 73 to pass the coin-arresting shoulder 68b but causes the upper shoulder 69a of the member 69 to protrude into the coin chute and arrest the coin 73 as shown in Fig. 7. At the same time, the coin 73 releases the member 71 so that without other provision, the second coin 74 would follow immediately behind the coin 73. This action is prevented by the protrusion of the upper shoulder 68a of the member 68 upon the movement of the member 68 in a clockwise direction, thus arresting the coin 74 at shoulder 68a as shown in Fig. 7. The drop of the second coin 74 to shoulder 68a is sufficient to prevent the return of the coin-actuated arm 34d to a position corresponding to the opening of contacts 34a, thus ensuring a continuity of the program signal supplied to output circuit 31. In case the first coin 73 were deposited during the transmission of an announcement and a control signal, it would occupy the position shown by the coin 74 of Fig. 7 before dropping to the position shown in Fig. 6.

Upon the termination of the announcement and the control signal from the sending station, the signal-responsive relay is deenergized and released, whereupon the biasing spring 35f acting on the armature 35c returns the coin-arresting members 68 and 69 to their normal positions represented in Figs. 6 and 8, whereupon the coin 73 drops upon the lower shoulder 69b of the coin-arresting member 69 as shown in Fig. 8. Simultaneously the second coin 74 drops from the upper shoulder 68a of the member 68 to the lower shoulder 68b, thus occupying the position of the first coin of Fig. 6 so that it is in position to repeat the cycle of the coin 73 upon subsequent transmission of announcements and the associated control signals.

Upon the transmission of a second announcement and a second control signal, the signal-responsive relay 35 is again actuated to rotate the coin-arresting members 68 and 69 to their positions represented in Fig. 7, whereupon the coin is released from the lower shoulder 69b as shown in Fig. 8 and collected in a suitable hopper (not shown) associated with the coin chute.

In other words, the signal-responsive relay 35 is effective to advance a coin through the coin-controlled mechanism by at least one step in response to the transmission of each control signal. Specifically, it is effective to advance a coin one step in response to each identifying characteristic of the control signal, that is one step upon initiation of the control signal and one step upon the termination thereof, whereby a deposited coin is collected only upon the receipt of two successive control signals.

The configuration of the camming element 34f of the switch 34 is such that, upon the fall of a deposited coin 73 to the lower shoulder 68b of the coin-arresting member 68 as shown in Fig. 6, it is effective to actuate the movable contact 34c of the switch to close the contacts 34b and open the contacts 34a. As described above, as soon as the contacts 34b are closed, a program signal supplied to the input terminals 33a of the coin-controlled unit 33 is applied to the signal output circuit 31 for reproduction by the loud speaker 32. Further movement of the coin 73 to the positions represented in Figs. 7 and 8 has no further effect on the switch 34. That is, the output circuit 31 is energized in response to the deposit of a coin for at least the interval between the transmission of two successive announcements and their associated control signals.

Figure 9:
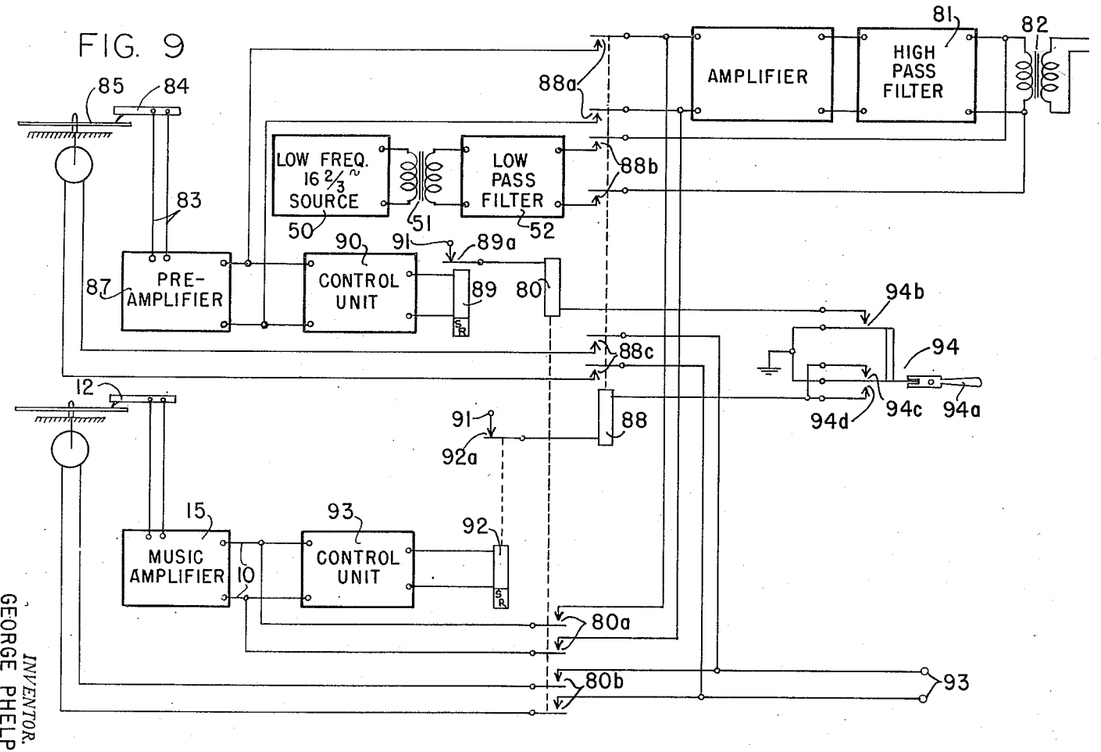
Fig. 9 is a circuit diagram, partially schematic of a modified form of sending station operable with the receiving station of Fig. 2.

The electrical signaling system of the invention is also adapted for use in a completely automatic system in which the announcements are made from an announcement record player and in which the announcements and the music programs succeed one another alternately. The sending station of such a modified form of the invention is represented in Fig. 9, it being understood that the receiving station operating therefrom may be identical to that of Fig. 2. In the system of Fig. 9 the program-announcement key 18 is replaced by an automatic sequence relay switching circuit. In the circuit of Fig. 9, the program record-playing phonograph 12, 13, 14 and the music preamplifier 15 may be identical to corresponding elements of Fig. 1. The program-representative signal-supply circuit 10 connected to the output terminals of the music preamplifier 15 is connected through contacts 80a of a transfer relay 80 and through a high-pass filter 81 and a coupling transformer 82 to the remaining portion of the signal-translating network, such as the line-matching network 24 of the system of Fig. 1.

The electrical signaling system of Fig. 9 also includes an announcement-representative signal-supply circuit 83 supplied from a pick-up arm 84 cooperating with a record turn-table 85 driven by a motor 86. The circuit 83 is connected by way of a preamplifier unit 87 and contacts 88a of a transfer relay 88 to the signal-translating channel including the high-pass filter 81. The low-frequency control signal source 50 coupling transformer 51 and low-pass filter 52 may be identical to corresponding elements of Fig. 1 and the output of this circuit is applied through contacts 88b of relay 88 to the input side of the broad-band coupling transformer 82.

The electrical signaling system of Fig. 9 also includes means for controlling the energization of the signal-transmission link from the signal-supply circuits 10 and 83 automatically to send signals therefrom in sequence, this means preferably comprising a plurality of means individually responsive to the energization of the signal-supply circuits 10, 83 for maintaining all but one thereof de-energized. Specifically, this includes an instantaneous pick-up, slow-release relay 89 energized from the preamplifier 87 through a suitable amplifying and rectifying control unit 90. The relay 89 is provided with contacts 89a which control the excitation of the transfer relay 80 from a source 91. Similarly, there is provided a second instantaneous pick-up, slow-release relay 92 energized from the signal-supply circuit 10 through an amplifying and rectifying control unit 93. The relay 92 is provided with contacts 92a which control the energization of the transfer relay 88 from the source 91. The transfer relay 88 is also provided with contacts 88c for controlling the energization of the announcement-player motor 86 from suitable supply terminals 93 which may be ordinary 60-cycle 110 volt commercial line. Similarly, the transfer relay 80 is provided with contacts 80b for controlling the energization of the program-player motor 14 from the supply terminals 93.

The electrical sending station of Fig. 9 also includes means for initiating the energization of one of the signal-supply circuits 10, 83, after which the automatic transfer from one circuit to the other is effected as described hereinafter. This initiating means comprises a manually operable three-position switch 94 having an operating element 94a and contacts 94b and 94c closable in the upper position of the operating element 94a and contacts 94d closable in the lower operating position of the element 94a, all contacts being open in the neutral position of the operating element 94a as shown in Fig. 9. The energization circuit for the transfer relay 80 is completed through the contacts 94b while the energization circuit for the transfer relay 88 is completed through either of the contacts 94c or 94d, these contacts being connected in parallel.

In considering the operation of the modified sending station of the invention represented in Fig. 9, it will be assumed that initially neither the program player nor the announcement player are in operation and that the switch 94 is in the neutral position illustrated. If now the operating element 94a of switch 94 is momentarily operated to close the switch contacts 94d, the energization circuit for the transfer relay 88 is completed and this relay operates to close its contacts 88c to start the announcement player motor 86 and simultaneously to close its contacts 88a to connect the announcement-signal circuit 83 to the signal-translating channel of the sending station. In addition, the contacts 88b of relay 88 are effective to apply a control signal from the source 50 to the signal-translating channel. When the announcement player 84, 85, 86 commences to play, the signal from the preamplifier unit 87 applied to the control unit 90 is sufficient to energize the relay 89 to open its contacts 89a and thus break the circuit to the transfer relay 80. As soon as the operator hears the announcement signal from the announcement player 84, 85, 86, the operating element 94a of switch 94 is actuated to open the contacts 94d and quickly to close the contacts 94b and 94c. This operation is sufficiently rapid that the transfer relay 88 is not deenergized and, while the circuit for the transfer relay 80 is energized through the contacts 94b, it is at this moment interrupted at the contacts 89a, so that the system continues operation in the condition described, that is, with an announcement signal from the supply circuit 83 and a low-frequency signal from the source 50 being transmitted simultaneously.

When the playing of the record by the announcement player 84, 85, 86 has been completed so that the announcement signal applied to the control unit 90 is interrupted, the slow-release relay 89 drops out after a short interval of time closing its contacts 89a to energize the transfer relay 80. This relay then operates, closing its contacts 80a to apply the program signal from the circuit 10 to the signal-translating channel and also closes its contacts 80b to energize the motor 14 from the supply circuit terminals 83.

As soon as the program player begins to play, the program signal at the circuit 10 is applied to the control unit 93 and energizes the slow-release relay 92, thereby opening its contacts 92a and deenergizing the transfer relay 88. When relay 88 is deenergized, the connections described above to the announcement player 84, 85, 86 are interrupted so that only the program player 12, 13, 14 is in operation. When the playing of the program record is completed, the program signal no longer appears at the supply circuit 10 and the slow-release relay 92 is de-energized, thereby closing its contacts 92a to complete the circuit to the transfer relay 88. The transfer relay 88 then operates to complete the connections to the announcement-record player, as described in the first instance. If the announcement player 84, 85, 86 and the program player 12, 13 and 14 are either of the automatic record changing type or the automatic repeating type, the cycle described above will be repeated indefinitely, the transfer relays 80 and 88 and their associated control relays 89 and 92, respectively, serving as interlocks between the announcement-signal circuit 83 and the program-signal circuit 10 to prevent simultaneous operation of both of these circuits at the same time. To interrupt the operating cycle, it is only necessary to actuate the operating element 94a of the switch 94 to its neutral position, thereby deenergizing the transfer relays 80 and 88 at the contacts 94b and 94c, respectively.

While there have been described what are at present considered to be the preferred embodiments of the invention, it will be apparent to those skilled in the art that various changes and modifications may be made therein without departing from the spirit or scope of the invention.

I claim:

1. A coin-controlled electrical signaling system for program distribution comprising, a sending station including a program-representative signal-supply circuit and means for controlling the sending of signals therefrom, a receiving station including a program-representative signal-output circuit and a coin-controlled means for controlling the energization of said output circuit, means for modifying the action of said coin-controlled means, a signal-transmission link between said stations, means at said sending station controlled by said first-named means for transmitting a control signal, and means at said receiving station responsive to said control signal for rendering said means for modifying the action of said coin-controlled means effective.

2. A coin-controlled electrical signaling system for program distribution comprising, a sending station including a plurality of signal-supply circuits and means for selectively controlling the sending of signals from either thereof, a receiving station including a signal-output circuit and a coin-controlled means for controlling the energization of said output circuit, means at said receiving station for modifying the action of said coin-controlled means, a signal-transmission link between said stations, means at said sending station controlled by said first-named means for transmitting a control signal only during energization of said link from a predetermined one of said signal-supply circuits, and means at said receiving station responsive to said control signal for rendering said means for modifying the action of said coin-controlled means effective.

3. A coin-controlled electrical signaling system for program distribution comprising, a sending station including a program-representative signal-supply circuit, an announcing circuit and means for selectively controlling the sending of signals from either thereof, a receiving station including a signal-output circuit and a coin-controlled means for controlling the energization of said output circuit, means at said receiving station for modifying the action of said coin-controlled means, a signal-transmission link between said stations, means at said sending station controlled by said first-named means for transmitting a control signal only upon energization of said link from said announcing circuit, and means at said receiving station responsive to said control signal for rendering said means for modifying the action of said coin-controlled means effective.

4. A coin-controlled electrical signaling system for program distribution comprising, a sending station including a program-representative signal-supply circuit, an announcing circuit and means for selectively controlling the sending of signals from either thereof, a receiving station including a program-representative signal-output circuit and a coin-controlled means for controlling the energization of said output circuit, means at said receiving station for modifying the action of said coin-controlled means, a signal-transmission link between said stations, means at said sending station controlled by said first-named means for transmitting a continuous low-frequency control signal only during energization of said link from said announcing circuit, and means at said receiving station responsive to said control signal for rendering said means for modifying the action of said coin-controlled means effective.

5. A coin-controlled electrical signaling system for program distribution comprising, a sending station including a program-representative signal-supply circuit and means for controlling the sending of signals therefrom, a receiving station including a program-representative signal-output circuit and a step-by-step coin-controlled means for controlling the energization of said output circuit, a signal-transmission link between said station, means at said sending station controlled by said first-named means for transmitting a control signal, and means at said receiving station responsive to said control signal for advancing a coin through said coin-controlled means by at least one step.

6. A coin-controlled electrical signaling system for program distribution comprising, a sending station including a program-representative signal-supply circuit and means for controlling the sending of signals therefrom, a receiving station including a program representative signal-output circuit and a step-by-step coin-controlled means for controlling the energization of said output circuit, a signal-transmission link between said stations, means at said sending station controlled by said first-named means for transmitting a control signal only while said link is disconnected from said signal-supply circuit, and means at said receiving station responsive to said control signal for advancing a coin through said coin-controlled means one step upon the initiation of said control signal and one step upon the termination thereof.

7. A coin-controlled electrical signaling system for program distribution comprising, a sending station including a program-representative signal-supply circuit, an announcing circuit and means for controlling the sending of signals therefrom, a receiving station including a program-representative signal-output circuit and a step-by-step coin-controlled means for controlling the energization of said output circuit, a signal-transmission link between said stations, means at said sending station controlled by said first-named means for transmitting a control signal having identifying characteristics upon the energization and de-energization of said link from said announcing circuit, and means at said receiving station responsive to said control signal for advancing a coin through said coin-controlled means one step in response to each of said identifying characteristics of said control signal.

8. A coin-controlled electrical signaling system for program distribution comprising, a sending station including a program-representative signal-supply circuit, an announcing circuit and means for controlling the sending of signals therefrom, a receiving station including a program-representative signal-output circuit and a step-by-step coin-controlled means for controlling the energization of said output circuit, a signal-transmission link between said stations, means at said sending station controlled by said first-named means for transmitting a continuous control signal only during the energization of said link from said announcing circuit, and means at said receiving station responsive to said control signal for advancing a coin through said coin-controlled means one step upon the initiation of said control signal and one step upon the termination thereof.

9. A coin-controlled electrical signaling system for program distribution comprising, a sending station including a program-representative signal-supply circuit and means for controlling the sending of signals therefrom, a receiving station including a program-representative signal-output circuit and a coin-controlled means for controlling the energization of said output circuit, a signal-transmission link between said stations, means at said sending station controlled by said first-named means for transmitting a control signal, and means at said receiving station responsive to said control signal for collecting a deposited coin upon the receipt of two successive control signals, whereby said output circuit is energized in response to a deposited coin for at least the interval between successive control signals.

10. A coin-controlled electrical signaling system for program distribution comprising, a sending station including a program-representative signal-supply circuit, an announcing circuit and means for selectively controlling the sending of signals from either thereof, a receiving station including a program-representative signal-output circuit and a coin-controlled means for controlling the energization of said output circuit, a signal-transmission link between said stations, means at said sending station controlled by said first-named means for transmitting a control signal upon each energization of said link from said announcing circuit, and means at said receiving station responsive to said control signal for collecting a deposited coin upon the receipt of two successive control signals, whereby said output circuit is energized in response to a deposited coin for at least the interval between successive announcements.

11. A coin-controlled electrical signaling system for program distribution comprising, a sending station including a program-representative signal-supply circuit and means for controlling the sending of signals therefrom, a receiving station including a program-representative signal-output circuit and a coin-controlled mechanism, said mechanism comprising a coin chute, a coin-operated element movable in said chute and effective to control the energization of said output circuit, a pair of coin-arresting members protruding into said chute and spaced along the path of movement of a coin therethrough, a signal-transmission link between said stations, means at said sending station controlled by said first-named means for transmitting a control signal, and means at said receiving station responsive to said control signal for actuating said members, whereby a deposited coin is collected upon the occurrence of two successive control signals.

12. A coin-controlled electrical signaling system for program distribution comprising, a sending station including a program-representative signal-supply circuit, an announcing circuit and means for selectively controlling the sending of signals from either thereof, a receiving station including a signal-output circuit and a coin-controlled means for controlling the energization of said output circuit, means at said receiving station for modifying the action of said coin-controlled means comprising means for independently energizing said output circuit, a signal-transmission link between said stations, means at said sending station controlled by said first-named means for transmitting a control signal only upon energization of said link from said announcing circuit, and means at said receiving station responsive to said control signal for rendering said means for modifying the action of said coin-controlled means effective, whereby an announcement may be transmitted to said output circuit independently of the deposit of a coin in said coin-controlled means.

13. A coin-controlled electrical signaling system for program distribution comprising, a sending station including a program-representative signal-supply circuit, an announcing circuit and means for selectively controlling the sending of signals from either thereof, a receiving station including a signal-output circuit and a coin-controlled means for controlling the energization of said output circuit, a signal-transmission link between said stations, means at said sending station controlled by said first-named means for transmitting a control signal only upon energization of said link from said announcing circuit, means for mechanically modifying the action of said coin-controlled means including electrical contacts for independently energizing said output circuit, and relay means at said receiving station responsive to said control signal for rendering said means for mechanically modifying the action of said coin-controlled means effective, whereby an announcement may be transmitted to said output circuit independently of the deposit of a coin in said coin-controlled means.

14. A coin-controlled electrical signaling system for program distribution comprising, a sending station including a program-representative signal-supply circuit, an announcing circuit and means for selectively controlling the sending of signals from either thereof, a receiving station including a signal-output circuit and a coin-controlled means including a coin-operated switch, a signal-transmission link between said stations, means at said sending station controlled by said first-named means for transmitting a control signal only upon energization of said link from said announcing circuit, and relay means at said receiving station responsive to said control signal for mechanically modifying the action of said coin-controlled means, said relay means having a two-position switch connected in one position to energize said output circuit directly and in the other position to energize said output circuit through said coin-operated switch, whereby an announcement may be transmitted to said output circuit independently of the deposit of a coin in said coin-controlled means.

15. A coin-controlled electrical signaling system for program distribution comprising, a sending station including a program-representative signal-supply circuit, an announcing circuit and means for selectively controlling the sending of signals from either thereof, a receiving station including a signal-output circuit and a coin-controlled means for controlling the energization of said output circuit, means at said receiving station for modifying the action of said coin-controlled means, a signal-transmission link between said stations, means at said sending station controlled by said first-named means for transmitting a control signal only upon energization of said link from said announcing circuit, means at said receiving station responsive to said control signal for rendering said means for modifying the action of said coin-controlled means effective, and means at said sending station for transmitting a control signal independently of said first-named means, whereby a program signal may be applied to said output circuit independently of the deposit of a coin in said coin-controlled means.

16. A coin-controlled electrical signaling system for program distribution comprising, a sending station including a plurality of signal-supply circuits and means for controlling said circuits to send signals therefrom in sequence, a receiving station including a program-representative signal-output circuit and a coin-controlled means for controlling the energization of said output circuit, means at said receiving station for modifying the action of said coin-controlled means, a signal-transmission link between said stations, means at said sending station for transmitting a control signal only upon energization of said link from a predetermined one of said supply circuits, and means at said receiving station responsive to said control signal for rendering said means for modifying the action of said coin-controlled means effective.

17. A coin-controlled electrical signaling system for program distribution comprising, a sending station including a program-representative signal-supply circuit, an announcement-representative signal-supply circuit and means for controlling said circuits to send signals therefrom in sequence, a receiving station including a signal-output circuit and a coin-controlled means for controlling the energization of said output circuit, means at said receiving station for modifying the action of said coin-controlled means, a signal-transmission link between said stations, means at said sending station for transmitting a control signal only upon energization of said link from said announcement-representative circuit, and means at said receiving station responsive to said control signal for rendering said means for modifying the action of said coin-controlled means effective.

18. A coin-controlled electrical signaling system for program distribution comprising, a sending station including a plurality of signal-supply circuits, a plurality of means individually responsive to the energization of said signal-supply circuits for maintaining all but one of said signal-supply circuits deenergized, and means for initiating energization of one of said signal-supply circuits, a receiving station including a signal-output circuit and a coin-controlled means for controlling the energization of said output circuit, means at said receiving station for modifying the action of said coin-controlled means, a signal-transmission link between said stations, means at said sending station for transmitting a control signal only upon energization of said link from a predetermined one of said supply circuits, and means at said receiving stations responsive to said control signal for rendering said means for modifying the action of said coin-controlled means effective.

19. A coin-controlled electrical signaling system for program distribution comprising, a sending station including a program-representative signal-supply circuit, an announcement-representative signal-supply circuit, a pair of relays individually responsive to the energization of said signal-supply circuits, each connected upon operation to deenergize the other of said signal-supply circuits, and means for initiating energization of one of said signal-supply circuits, a receiving station including a signal-output circuit and a coin-controlled means for controlling the energization of said output circuit, means at said receiving station for modifying the action of said coin-controlled means, a signal-transmission link between said stations, means at said sending station for transmitting a control signal only upon energization of said link from said announcement-representative circuit, and means at said receiving station responsive to said control signal for rendering said means for modifying the action of said coin-controlled means effective.

20. A coin-controlled electrical signaling system for program distribution comprising, a sending station including a program-representative signal-supply circuit, an announcement-representative signal-supply circuit and means for controlling said circuits to send signals therefrom in sequence, a receiving station including a signal-output circuit and a coin-controlled means for controlling the energization of said output circuit, independent means at said receiving station for controlling the energization of said output circuit, a signal transmission-link between said stations, means at said sending station for transmitting a control signal only upon energization of said link from said announcement representative circuit, and means at said receiving station responsive to said control signal for rendering said independent means for controlling the energization of said output circuit effective to energize said output circuit.

GEORGE PHELPS.

REFERENCES CITED

The following references are of record in the file of this patent:

UNITED STATES PATENTS

| Number | Name | Date |
|---|---|---|
| 1,480,403 | Lattig et al. | Jan. 8, 1924 |
| 1,747,199 | Wheeler | Feb. 18, 1930 |
| 1,804,559 | Hoke | May 12, 1931 |
| 1,873,813 | Bergmann | Aug. 23, 1932 |
| 2,041,933 | Inglis | May 26, 1936 |
| 2,041,964 | Sandalls | May 26, 1936 |
| 2,061,875 | Johns | Nov. 24, 1936 |
| 2,133,523 | Alexandersson et al. | Oct. 18, 1938 |
| 2,134,168 | Wright | Oct. 25, 1938 |
| 2,242,197 | West et al. | May 13, 1941 |
| 2,290,817 | Smith | July 21, 1942 |
| 2,306,654 | Triman | Dec. 29, 1942 |
| 2,396,756 | Snodgrass | Mar. 19, 1946 |